US005546527A

United States Patent [19]

Fitzpatrick et al.

[11] Patent Number: 5,546,527
[45] Date of Patent: Aug. 13, 1996

[54] OVERRIDING ACTION DEFAULTS IN DIRECT MANIPULATION OF OBJECTS ON A USER INTERFACE BY HOVERING A SOURCE OBJECT

[75] Inventors: Greg P. Fitzpatrick, Keller; Thom R. Haynes, Euless, both of Tex.

[73] Assignee: International Business Machines Corporation, Armonk, N.Y.

[21] Appl. No.: 247,384

[22] Filed: May 23, 1994

[51] Int. Cl.⁶ .................................................. G06F 3/14
[52] U.S. Cl. ............................................................ 395/159
[58] Field of Search .................................. 395/159, 157, 395/155, 161, 156, 158

[56] References Cited

U.S. PATENT DOCUMENTS

| | | | |
|---|---|---|---|
| 5,140,677 | 8/1992 | Fleming et al. | 395/159 |
| 5,388,203 | 2/1995 | Kaneko | 395/159 |
| 5,392,389 | 2/1995 | Fleming | 395/159 |
| 5,416,901 | 5/1995 | Torres | 395/159 |
| 5,422,993 | 6/1995 | Fleming | 395/159 |
| 5,428,734 | 6/1995 | Haynes et al. | 395/159 |
| 5,434,965 | 7/1995 | Matheny et al. | 395/159 |
| 5,461,710 | 10/1995 | Blomfield et al. | 395/161 |

OTHER PUBLICATIONS

*Pause Preview: A Technique for Improving the Interactivity of Direct Manipulation*, IBM Technical Disclosure Bulletin, vol. 34, No. 7A, Dec. 1991, pp. 20–25.
*Valid Drag/Drop Designation During Batch Registration*, IBM Technical Disclosure Bulletin, vol. 33, No. 11, Apr. 1991, pp. 272–273.

*Primary Examiner*—Mark R. Powell
*Assistant Examiner*—Crescelle N. dela Torre
*Attorney, Agent, or Firm*—Geoffrey A. Mantooth

[57] ABSTRACT

A user can directly manipulate objects on a data processing system user interface by dragging a source object and then dropping the source object onto the target. Dropping the source object onto a target performs an action. The action is performed in accordance with parameters. The parameters have defaults. The user can override these defaults by positioning the source object on the target and delaying the drop of the source action. The source object is thus "hovered" over the target. After hovering for a predetermined amount of time, an indication of a successful hover is provided to the user. If the user then drops the source object onto the target, the user is prompted for new parameter values. Upon receiving the new parameter values, the action is then performed in accordance with the new values.

13 Claims, 6 Drawing Sheets

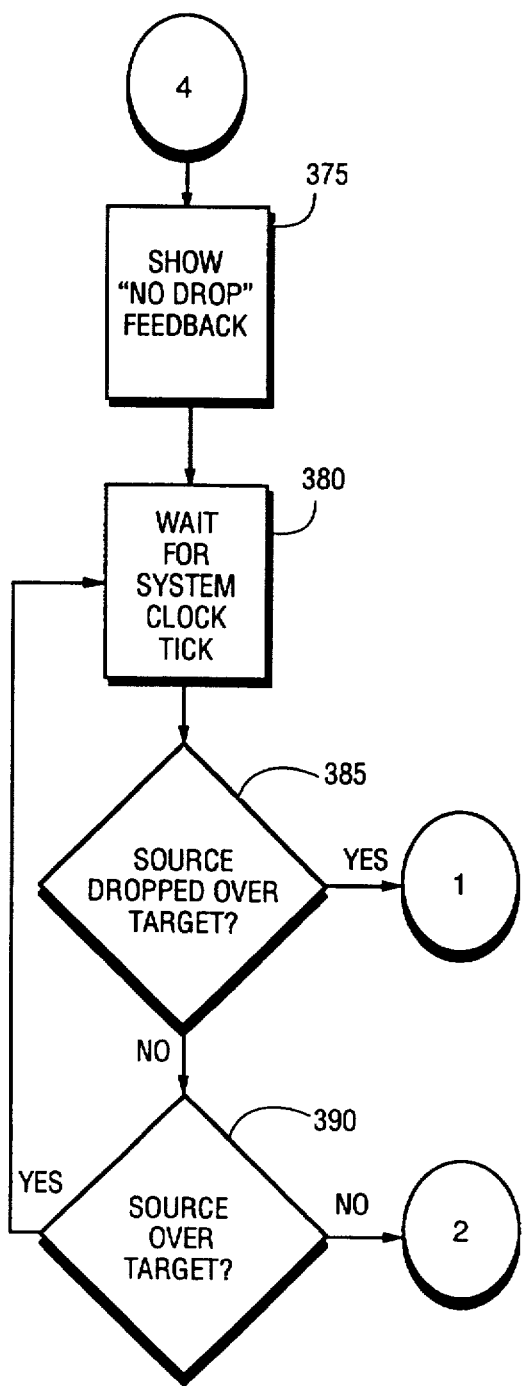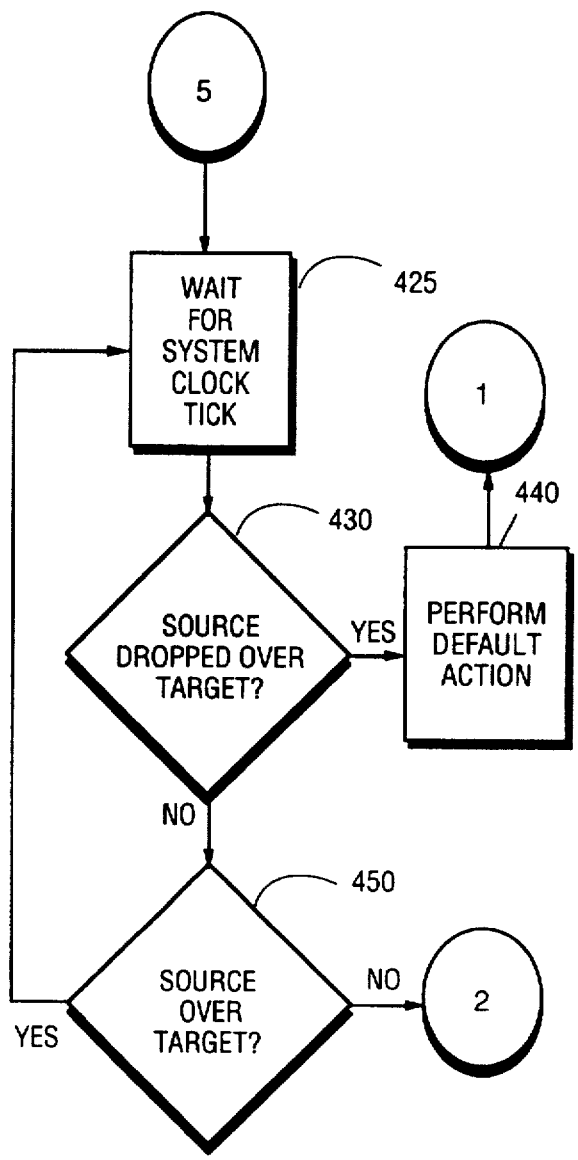
Fig. 6
Fig. 7

OVERRIDING ACTION DEFAULTS IN DIRECT MANIPULATION OF OBJECTS ON A USER INTERFACE BY HOVERING A SOURCE OBJECT

TECHNICAL FIELD OF THE INVENTION

The present invention relates to systems and method for the direct manipulation of objects (such as a file icon or a printer icon) on a user interface of a data processing system.

BACKGROUND OF THE INVENTION

Direct manipulation allows a user to drag an object (such as an icon, a window (or panel), or text) that is displayed on a computer screen. The user can drop the object onto a target. The dropped object is known as the source object. If an action is appropriate to the act of dropping, then the target and source will somehow "affect" each other in a manner that is specified by the target or source's defaults or characteristics.

For example, suppose a user wished to print a file that is labeled "document A". Document A is represented on the computer screen by an icon. The user uses a mouse pointer to drag the document A icon towards an icon that represents a printer. When the document A icon is located on top of the printer icon, the user releases the document A icon, thereby dropping it onto the printer icon. The specific printer that is represented by the printer icon will then print document A in accordance with default parameters that are associated with the printer icon.

Suppose, however, that the user wished to change the default parameters of the print action. For example, the user may wish to specify a different printer or a different paper size. Conventional art requires changing the default parameters outside of the direct manipulation operation. The user can use a command line directive to directly change the parameters. However, direct manipulation is meant to encourage the use of Graphical User Interfaces (GUI's) in order to simplify the learning process of the interface for a user. Many users may be unfamiliar with such a command line or its proper use. Another way to change the default parameters is for the user to open the printer object. Once the printer object is opened, the user must navigate through the printer interface (such as a window) to find the default parameter settings and then change those settings. After the settings have been changed, the user then closes the printer object and drags the document object to the printer object. The document object is then dropped onto the printer object. After the drop operation has occurred, the default parameters can be restored by either using a command line or by reopening the printer object and repeating the above procedure.

SUMMARY OF THE INVENTION

It is an object of the present invention to provide a system and method for overriding default parameters of an object on a data processing system user interface.

The present invention provides a method and subsystem for directly manipulating a source object on a user interface of a data processing system so as to perform an action. The action has at least one parameter for implementing the action. The parameter has a default. The invention determines if the source object is being directly manipulated. The invention also determines if the source object is located over a target that is suitable for a drop of the source object. If the target is suitable for a drop of the source object, then the determination is made if the source object is located on the target, without being dropped, for a predetermined amount of time. If the source object is located on the target, without being dropped, for the predetermined amount of time, then a user is prompted for an override of the default.

In one aspect of the present invention, the invention determines if the source object has been dropped on the target before the user is prompted for an override of the default.

In another aspect of the present invention, the user is prompted for an override of the default by displaying a dialog box to the user.

In still another aspect of the present invention, after the user is prompted for an override of the default parameter, a new value for the default is accepted. The action is then performed in accordance with the new value for the parameter.

In still another aspect of the present invention, an indication is provided to the user that the source object has been located on the target without being dropped for a predetermined amount of time. Also, it is determined if the source object is moved off of the target before the source object has been dropped. If the source object has been moved off of the target before being dropped, then the indication is removed.

The present invention allows a user to easily override default values of parameters of an action by hovering the source object over the target for a predetermined amount of time. Hovering the source object is accomplished by positioning the source object over the target and then delaying the drop of the source object. After the predetermined amount of time has passed, the user can drop the source object onto the target, wherein the user is prompted to temporarily override the parameter values. After receiving the new parameter values, the drop action is performed in accordance with those new parameter values.

Thus, a user can override default values within the direct manipulation context, without having to utilize another context as in prior art techniques. The present invention simplifies overriding parameter values by reducing the number of actions required to perform a nonstandard action.

This is done while minimizing the number of windows on the display. With graphical user interfaces, users may require many windows or icons on the interface, thereby taking up valuable display screen space. The present invention provides a temporary prompt (typically in the form of a box or window) that is displayed after the drop has occurred and is removed from the display before the action is implemented.

The user can easily revert to the default values. Once the time threshold has passed and a successful hover of the source over the target has occurred, the user can move the source object off of the target. This procedure has the effect of eliminating the hover action and reverting to the default values. In addition, for subsequent implementations of the action, the default values are utilized, unless the default values are again overriden with hovering.

BRIEF DESCRIPTION OF THE DRAWINGS

FIG. 2 shows a desktop populated by various objects. FIG. 3 shows a document A object, after it has been dragged to be on top of a printer object. The document A object is hovering over the printer object. FIG. 4 shows a dialog box that has been opened, after the document A object has hovered over the print object for a specified amount of time.

FIGS. 5–7 are flow charts of the present invention, in accordance with the preferred embodiment. FIG. 6 shows the method for handling direct manipulation of a source object over an object that is not a suitable target. FIG. 7 shows a method for handling a drop in action using default parameters.

DESCRIPTION OF THE INVENTION

Figure 1:
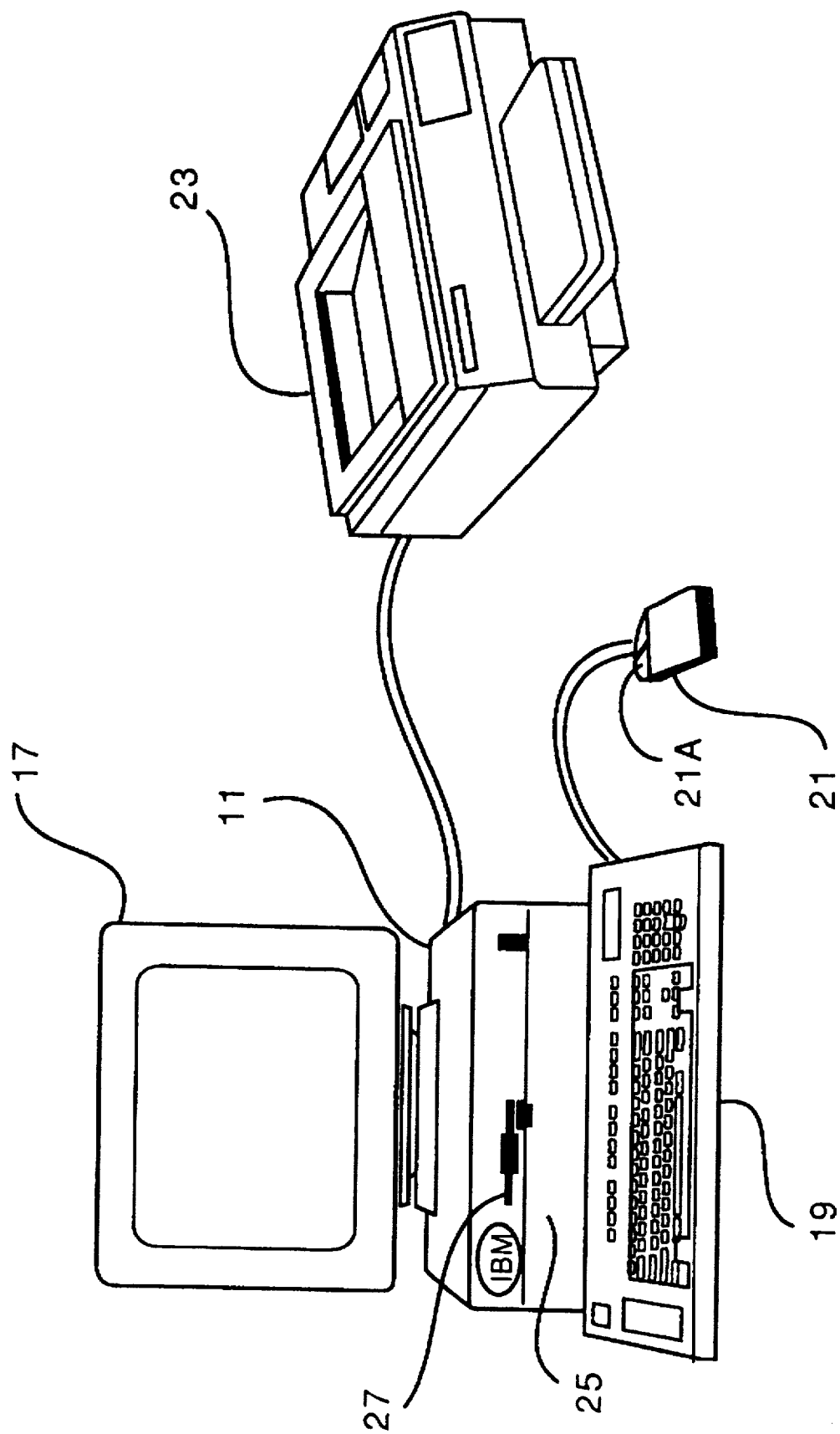
FIG. 1 is a schematic view of a data processing system upon which the present invention can be practiced.

In FIG. 1, there is shown a schematic diagram of a data processing system 11 or computer, upon which the present invention can be practiced. The computer 11 includes a user interface, which interface has a display screen 17 and a keyboard 19. Other input devices may also be provided, such as a mouse 21, a touch screen and a microphone for voice input. The computer 11 may also be coupled to a printer 23 or other output device. The computer 11 typically includes hard disk drive (or fixed disk) 25 and floppy disk drive 27 storage devices.

The computer also has internal memory in the form of random access memory (RAM), which stores instructions and programs. One such program is an operating system. In addition, the internal memory stores the direct manipulation service of the present invention. The direct manipulation service can be stored on a hard disk in the hard disk drive 25 or on a floppy disk.

Figure 2:
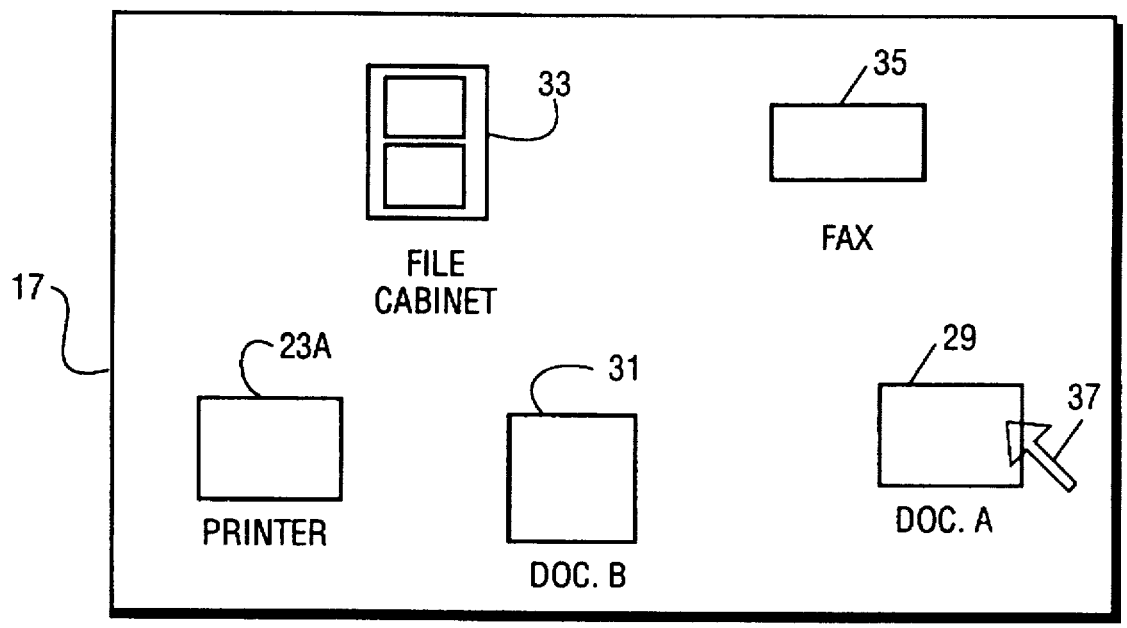
FIGS. 2–4 are schematic views of a display screen illustrating an example of the present invention.
Figure 3:
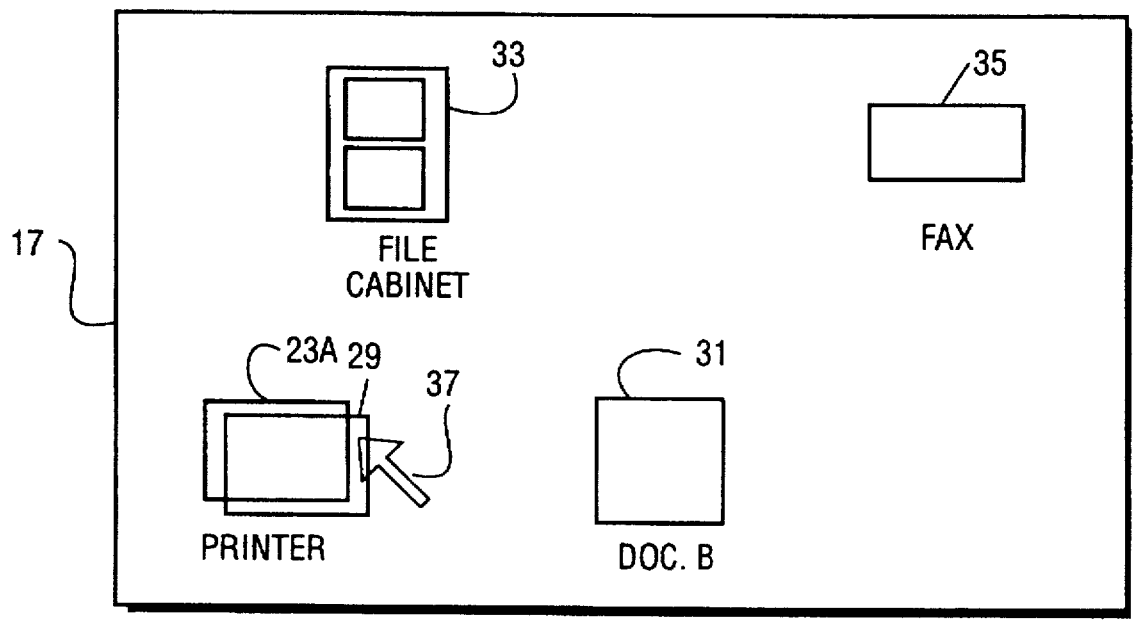

In FIG. 2, there is shown a schematic representation of the screen 17 populated with objects. The objects are shown in FIG. 2 as icons. However, objects can also be windows (or panels), text, an empty region on the screen, etc. There is an icon 23A that represents the printer 23, a document A icon 29, a document B icon 31, a file cabinet icon 33 (which is a representation of a file cabinet in the internal memory of the computer) and a fax icon 35. There is also shown a mouse pointer 37 or cursor. The position of the mouse pointer 37 is manipulated by the mouse 21.

Referring to FIGS. 1–4, an example of a direct manipulation operation in accordance with the present invention will now be described. Suppose that a user wishes to print the contents of the document A icon 29 using the printer 23 (of FIG. 1). The document A icon 29 can be printed by performing a drag and drop operation. The user positions the mouse pointer 37 on the document A icon 29 (see FIG. 2). The user then presses a mouse button 21A (typically a left mouse button) to lock the document A icon 29 to the mouse pointer 37. The user then moves the mouse 21 so as to move the mouse pointer 37 towards the printer icon 23A while maintaining the pressed mouse button. This causes the mouse pointer 37 to drag the document A icon 29 (the source object) along with it.

When the document A icon 29 overlays the printer icon 23A (see FIG. 3), the present invention determines if the printer is a suitable target. If the printer is a suitable target, then an indication is provided so as to notify the user of this fact. Such an indication could be visual or auditory or both. An example of a visual indication of a successful hovering action is where the printer icon changes color. Another way to provide an indication is by slightly altering the icon graphics, such as by slightly enlarging the icon or by providing a flashing icon.

When an object such as a document is dropped onto the printer icon, a print action is performed. The print action is performed in accordance with one or more parameters, such as the specific printer and paper size. These parameters can be provided with default values. In the prior art, there are many ways to change a default value from a first value to a second value.

The user may wish to temporarily override the parameter default values of the action that is to be performed. With the present invention, this is easily accomplished by causing the document A icon to "hover" over the printer (or target) icon (see FIG. 3). Hovering is accomplished by maintaining the position of the document A icon over the printer icon and delaying any drop operation. Thus, the mouse button 21A that is used to drag the document A icon remains pressed.

After a predetermined amount of time has lapsed (for example, 2–5 seconds), an indication is provided to the user that the default values of the drop operation can be overridden. This indication can be provided either by visual or audible means, or both.

Figure 4:
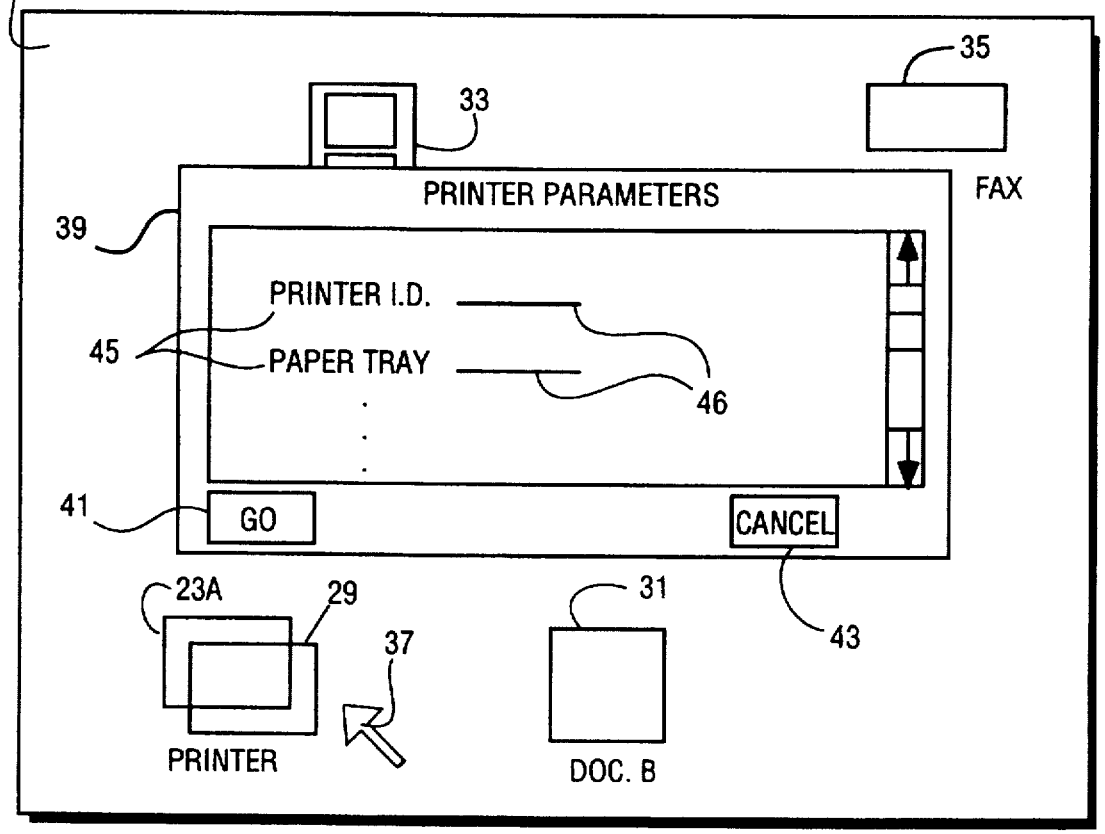

To drop the document A icon 29 onto the printer icon, the user releases the mouse button 21A. If the hovering action has been successful, then a dialog box 39 is displayed, as shown in FIG. 4. The dialog box provides a list of available parameters 45 and allows the user to quickly edit the values 46 of the desired parameters. To implement the drop action from the dialog box, the user selects the "go" pushbutton 41. (Selection could occur by the user positioning the mouse pointer 37 over the "go" pushbutton 41 and then pressing a mouse button 21A.) This causes the dialog box 39 to disappear from the screen 17 and the action to be implemented in accordance with the selected parameter values.

The hovering of the source object over the target only changes the default value or values temporarily. During a subsequent drop operation onto the same target, the action will be taken in accordance with the default values. Thus, after a successful hovering and implementation of the action by the target, the parameters "revert" back to the default values. Alternatively, the default values could be masked from implementation by the new and temporary parameter values.

If the document A icon is dropped onto the printer icon before the specified hover time period has lapsed, then the drop action is performed with the default parameters. Thus, in the example, the document A is printed on a default printer with default print parameters.

After a user has caused a source object to hover for the specified time period over a target, the user may change his or her mind and desire to drop with the default parameters after all. Continuing with the example, to restore the default parameters, the user need only move the document A icon 29 off of the printer icon 23A (while maintaining the pressed mouse button 21A to avoid a drop). Then, the user repositions the document A icon 23A on the printer icon 21A and quickly releases the mouse button 21A (before the specified hover time period lapses). The drop action will be performed with the default parameters. If the user wishes to revert to the default parameters while the dialog box 39 is displayed, the user can, for example, select the "cancel" pushbutton 43. Other mechanisms, such as a "default" pushbutton can be used as well.

Referring now to FIGS. 5a–7, the flow charts of the present invention will be described. In the flow charts, the following graphical conventions are observed: a rectangle is used to illustrate either a process, a function or screen display, a diamond is used to illustrate a decision, and a circle or oval is used to illustrate a connector to a step of a flow chart. These conventions are well understood by programmers skilled in the art of user interfaces and the flow charts are sufficient to enable a programmer skilled in the art to write code in any suitable computer programming language, such as PASCAL or C for a computer such as the IBM Personal System/2 (PS/2) family of computers which supports these languages. (IBM and Personal System/2 are trademarks of International Business Machines Corporation.)

Figure 5A:
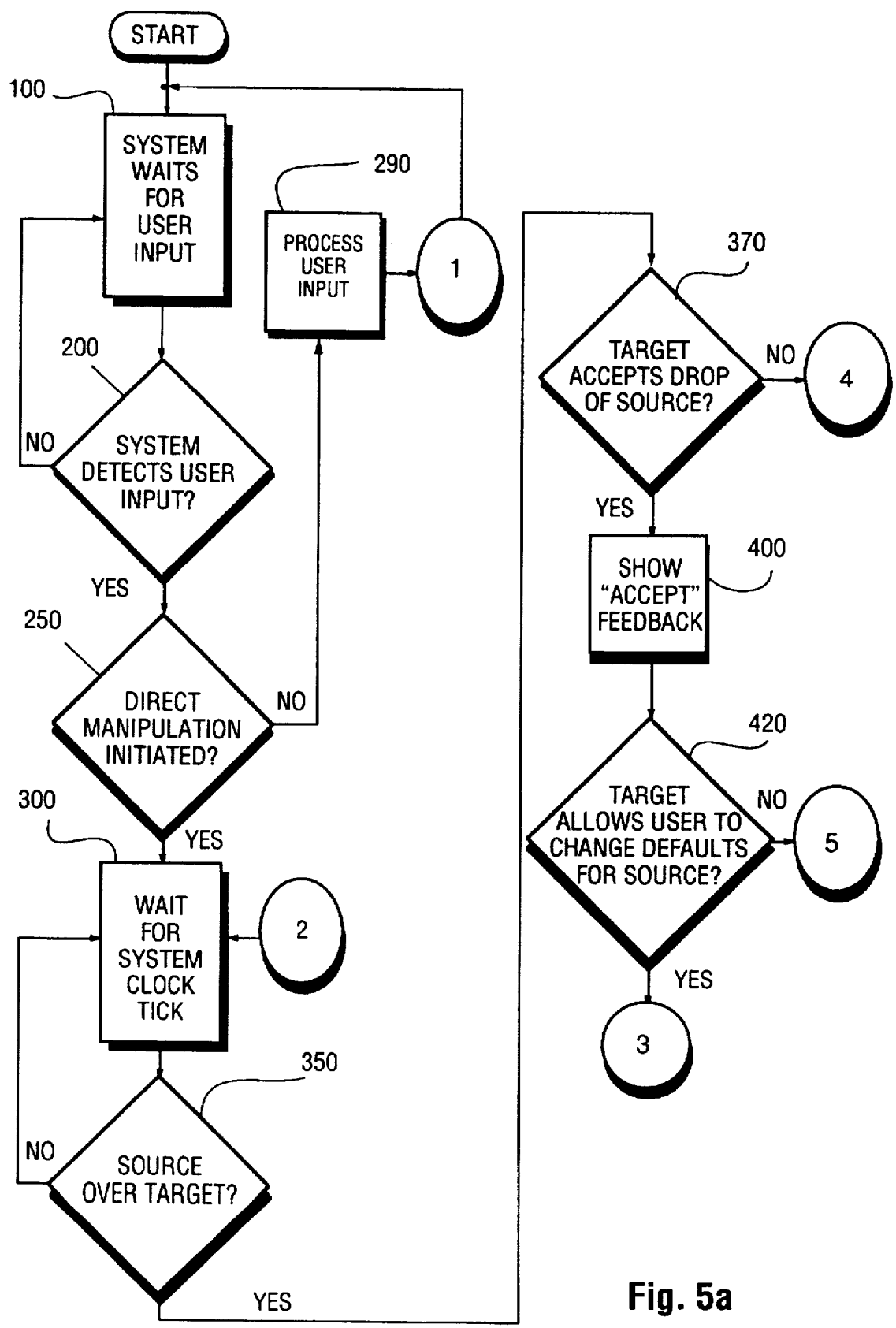
FIGS. 5a and 5b show the main method for direct manipulation of objects and for determining if a hovering operation has occurred.
Figure 5B:
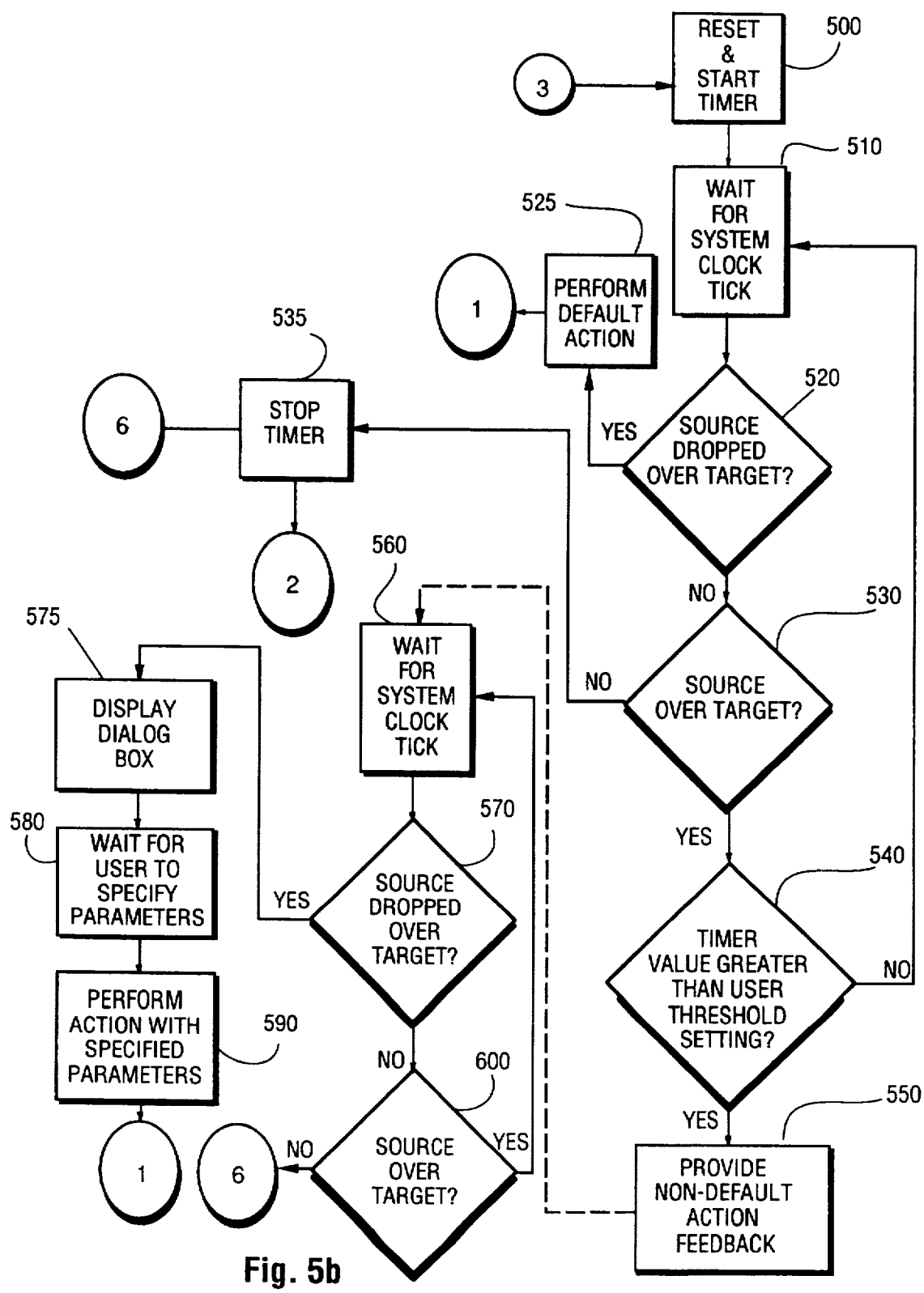

The flow charts will first be described generally, followed by a more specific discussion of the steps. The flow chart of FIGS. 5a and 5b shows the main method for direct manipulation of objects and for determining if a hover operation has occurred. The flow chart of FIG. 6 shows the method for handling direct manipulation of a source object over an object that is not a suitable target. The flow chart of FIG. 7 shows the method for handling a drop action using default parameters.

Referring now to FIGS. 5a and 5b, the main direct manipulation method will be described. The method is started upon startup and initialization of the Graphical User Interface that allows direct manipulation operations to occur. For example, an operating system may provide such direct manipulation services. When the operating system is booted by virtue of its being loaded into RAM, then the main method of FIGS. 5a and 5b is started and initialized. The method then waits for a user input from the Graphical User Interface, step 100. When an input is detected, in accordance with conventional techniques, the method proceeds to step 200.

In steps 200 and 250, the method screens the input. In step 200, the method determines if the system has detected a user input as Opposed to some other type of input. If the result of step 200 is NO, then the method returns to step 100 to await another user input. However, if the result of step 200 is YES, then the method proceeds to step 250. In step 250, the method determines if direct manipulation has been initiated by the user input. This is dependent upon the particular type of operating system in use. For example, in OS/2, a direct manipulation is detected if mouse manipulation button number two is pressed with the mouse pointer positioned over an object and the mouse pointer is moved. (OS/2 is a trademark of International Business Machines Corporation.) If the result of step 250 is NO (meaning that direct manipulation has not been initiated), then the method proceeds to step 290. In step 290, the user input is processed in a conventional manner. An example of such a user input would be selecting an action from an action bar of a window. After step 290, the method returns to step 100 to await another user input.

Returning to step 250, if the result is YES (a direct manipulation has been initiated), then the method proceeds to step 300. In step 300, the method waits for a system clock tick. This is because in the preferred embodiment, the method does not poll for feedback. Instead, the method waits for the next discrete time interval, as provided by a clock in the data processing system 11. However, other embodiments could poll for feedback or utilize some other method of coordination. Once a clock tick has been detected, the method then determines if the user input has positioned a source object over a possible target (such as a target object), step 350. This determination is dependent on the type of operating system used. For example, an operating system may track the location of a hot spot or pixel at the tip of the mouse pointer 37. If this hot spot is within the boundary of a target, then the source object is over the target. If a source object has not yet been positioned over a possible target, then there is no likelihood of a meaningful drop action. Therefore, if the result of step 350 is NO, then the method returns to step 300 to await another system clock tick and movement of the source object. However, if the result of step 350 is YES (a source object is positioned over a possible target), then the method proceeds to step 370.

In step 370, the method determines if the target object would accept a drop of the source object. Only certain source-target pairs are meaningful in a direct manipulation environment. For example, a document-printer pair is meaningful because the printer is capable of printing a document. However, a fax-printer pair is typically meaningless because the printer is incapable of printing the facsimile device. There is provided in memory a table of valid pairs. This table is interrogated in step 370. If no table entry is found for the source-target pair, then the result of step 370 is NO and the method proceeds, by way of connectors "4", to FIG. 6 and step 375 therein.

Referring now to FIG. 6, the steps shown therein effectively handle a drop of a source object onto an improper target. In step 375, an indication is provided to the user that the underlying object is not a suitable drop target. Such an indication can be provided by either visual or audible means. For example, a "no drop" message can be displayed. This could be a circle with a slash therethrough, with the circle positioned over the target. Then, the method waits for a system clock tick, step 380. After detecting a tick, the method proceeds to step 385 to determine if the source object has been dropped on the underlying, or target, object. This is accomplished by determining if the mouse button 21A has been released. If a drop has occurred, then the result of step 385 is YES and the method returns, by way of connectors "1", to step 100 of FIG. 5a. Thus, the drop action has no effect. If there is no drop, then the result of step 385 (of FIG. 6) is NO and the method proceeds to step 390. In step 390, the method determines if the source object is still located over the target. For example, the user may have merely dragged the document A object over another object on route to the printer object. If the source object is no longer over the target, then a NO result is produced by step 390 and the method returns, by way of connectors "2", to step 300 in FIG. 5a. In step 300, the method awaits another clock tick. Returning to step 390 of FIG. 6, if the result is YES, then the method returns to step 380 to await a clock tick.

Returning now to step 370 of FIG. 5a, if the result of step 370 is YES (wherein the target object would accept a drop of the source object), then the method proceeds to step 400. In step 400, an indication that a drop would be accepted is provided to the user. This indication could be by either visual or audible means. The method then proceeds to step 420.

In step 420, the method determines if the target object allows a user to change or override any default values associated with the drop action by the source-target pair. This determination can be made, for example, by checking a setting on the target. The target setting indicates if defaults can be changed or overriden. If the result of step 420 is NO, then the drop action is performed with the default values. The method proceeds, by way of connectors "5", to step 425 of FIG. 7.

Referring now to FIG. 7, in step 425, the method waits for a system clock tick. After a tick is detected, the method determines if the source object has been dropped onto the target object by releasing the mouse button 21A, step 430. If the result of step 430 is YES, then the method proceeds to step 440. In step 440, the drop action is performed with the default values. The method then returns by way of connectors "1" to step 100 of FIG. 5a. Returning now to step 430 of FIG. 7, if the result of step 430 is NO, then the method proceeds to step 450. In step 450, the method determines if the source object is still over the target object. If the result of step 450 is YES, then the method returns to step 425 to wait for a clock tick. However, if the result of step 450 is NO (wherein the source object is moved off of the target object), then the method proceeds, by way of connectors "2" to FIG. 5a and step 300.

Referring now to FIG. 5a and step 420, if the result of step 420 is YES (wherein the target object allows a user to change the default parameters), then the method proceeds by way of connectors "3" to FIG. 5b and step 500.

In steps 500–540, the method determines if the source object has hovered over the target for a sufficient amount of time. Specifically, in step 500, a timer is reset and started. In the preferred embodiment, the timer counts system clock ticks. In step 510, the method waits for a system clock tick. In step 520, the method determines if the source object has been dropped onto the target. If the result of step 520 is YES, then the method proceeds to step 525, wherein the drop action is performed with the default parameters. In addition, the timer is stopped. After step 525, the method returns by way of connectors "1" to FIG. 5a and step 100.

Returning to step 520, if the result of step 520 is NO (a drop has not yet occurred), then the method proceeds to step 530. In step 530, the method determines if the source object is still over the target object. If the result of step 530 is NO, then the timer is stopped, step 535, and the method returns by way of connectors "2" to FIG. 5a and step 300. However, if the result of step 530 is YES, then the method proceeds to step 540.

In step 540, the method determines if the value of the timer is greater than a threshold setting. The timer value is, in the preferred embodiment, the number of system clock ticks that have been counted by the timer. The threshold setting is an integer value that is provided as a default. However, the user can customize the threshold setting. A typical threshold setting would be 2–5 seconds or some equivalent representation.

If the source object has not been held over the target for a time that is greater than the threshold setting, then the result of step 540 is NO, and the method loops back to step 510 to await another system clock tick.

However, if the source object has been held over the target for a time that is greater than the threshold setting, then the result of step 540 is YES and the method proceeds to step 550.

In step 550, the method provides visual or audible feedback to the user, which feedback indicates that a non-default action can be performed. For example, the mouse pointer 37 could be changed visually by changing color or visual texture. The user will be able to specify non-default values for the parameters after the source object has been dropped.

In step 560, the method waits for a system clock tick. In step 570, the system determines if the source object has been dropped onto the target object. If the result of step 570 is YES, then the method proceeds to step 575. In step 575, a dialog box 39 (see FIG. 4) is displayed. The dialog box contains a list 45 of alterable parameters for the operation. In step 580 of FIG. 5b, the method waits for the user to specify non-default values for the parameters. This is accomplished by the user entering the desired values 46 and then selecting the "go" pushbutton 41 on the dialog box 39 (see FIG. 4). After the non-default values have been specified, the drop action is performed in accordance with the non-default values, step 590. After step 590, the method then returns to step 100.

Returning to step 570, if the result is NO (the source object has not been dropped onto the target), then the method proceeds to step 600. In step 600, the method determines if the source object is still positioned over the target. If the result of step 600 is YES, then the method returns to step 560 to await another system clock tick. If the result of step 600 is NO, then the method proceeds by way of connectors "6" to step 535 to stop the timer and then on to step 300.

After the action has been performed, the default values are restored for that action. Thus, on the subsequent implementation of the action, the default values will be utilized, unless they have been overriden again through the use of hovering.

Although the present invention has described prompting a user with a dialog box in order to allow the user to override default values, other prompting mechanisms can be used as well.

The foregoing disclosure and the showings made in the drawings are merely illustrative of the principles of this invention and are not to be interpreted in a limiting sense.

What we claim is:

1. A method of directly manipulating a source object on a user interface of a data processing system so as to perform an action, said action having at least one parameter for implementing said action, said parameter having a default, comprising the steps of:

a) determining if said source object is being directly manipulated;

b) determining if said source object is located over a target that is suitable for a drop in of said source object;

c) if said target is suitable for a drop of said source object, then determining if said source object is located on said target without being dropped for a predetermined amount of time; and d) if said source object is located on said target without being dropped for said amount of time, then prompting a user for an override of said default.

2. The method of claim 1 wherein said step of prompting a user for an override of said default if said source object is located on said target without being dropped for said amount of time, further comprises the step of determining if said source object has been dropped on said target before prompting said user for an override of said default.

3. The method of claim 1 wherein said step of prompting a user for an override of said default, further comprises the step of displaying a dialog box to said user.

4. The method of claim 1, further comprising the steps of:

a) after prompting a user for an override of said default, accepting a new value for said default; and b) performing said action with said new value.

5. The method of claim 1, further comprising the step of providing an indication to said user that said source object has been located on said target without being dropped for said amount of time.

6. The method of claim 5, further comprising the steps of:

a) determining if said source object is moved off of said target before being dropped;

b) if said source object is moved off of said target before being dropped, then removing said indication.

7. A subsystem for directly manipulating a source object on a user interface of a data processing system so as to perform an action, said action having at least one parameter for implementing said action, said parameter having a default, comprising:

a) means for determining if said source object is being directly manipulated;

b) means for determining if said source object is located over a target that is suitable for a drop in of said source object;

c) means for determining if said source object is located on said target without being dropped for a predetermined amount of time if said target is suitable for a drop of said source object; and d) means for prompting a user for an override of said default if said source object is located on said target without being dropped for said amount of time.

8. The subsystem of claim 7 wherein said means for prompting a user for an override of said default if said source object is located on said target without being dropped for said amount of time, further comprises means for determining if said source object has been dropped on said target before prompting said user for an override of said default.

9. The subsystem of claim 7 wherein said means for prompting a user for an override of said default, further comprises means for displaying a dialog box to said user.

10. The subsystem of claim 7, further comprising:

a) means for accepting a new value for said default parameter; and b) means for performing said action with said new value.

11. The subsystem of claim 7, further comprising means for providing an indication to said user that said source object has been located on said target without being dropped for said amount of time.

12. The subsystem of claim 11, further comprising:

a) means for determining if said source object is moved off of said target before being dropped;

b) means for removing said indication, if said source object is moved off of said target before being dropped.

13. A data processing system for providing direct manipulation of objects located thereon, comprising:

a) a display, said display having a source object, a target and a cursor located thereon;

b) an input device for dragging and dropping said source object with said cursor;

c) a timer that monitors the amount of time that said source object is positioned, without being dropped, on said target; and d) a controller for providing on said display a prompt to a user for an override of a default parameter of an action that is to be performed by dropping said source object on said target, said controller being responsive to said timer so as to operate when said timer determines that said source object has been positioned, without being dropped, on said target for a predetermined amount of time.

* * * * *